United States Patent Office 3,439,151
Patented Apr. 15, 1969

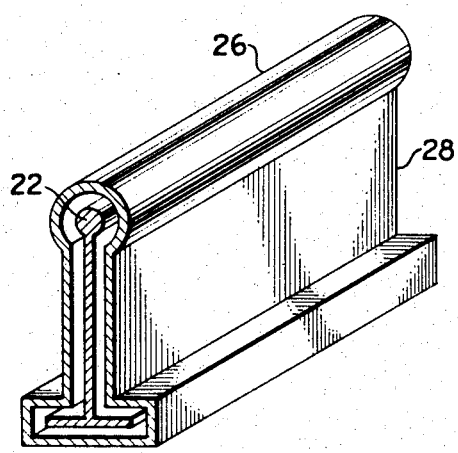
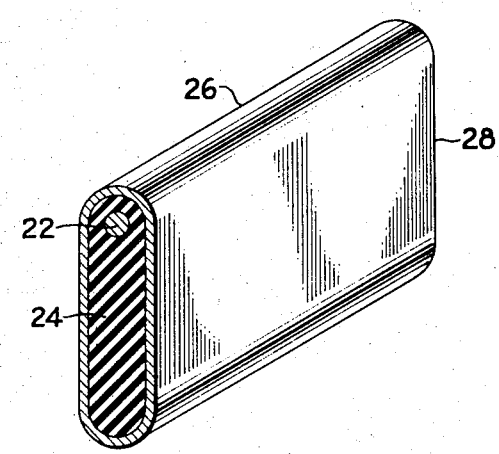
Fig. 2　　　　Fig. 3
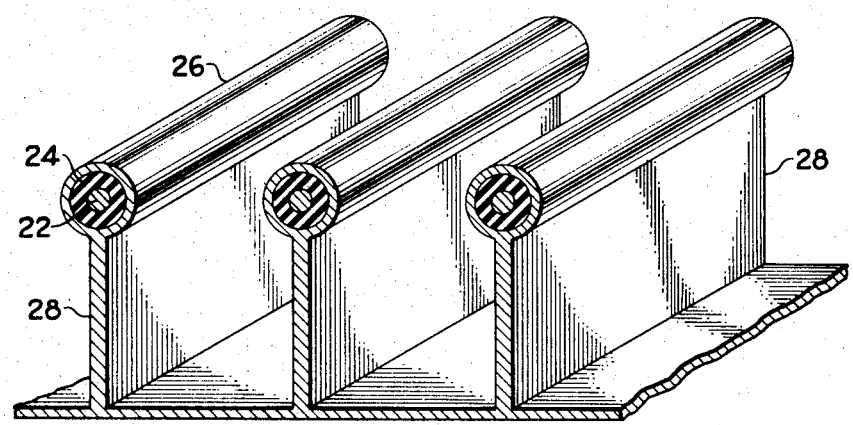
Fig. 4
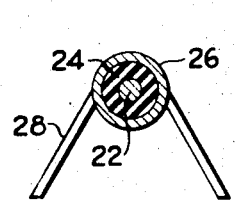
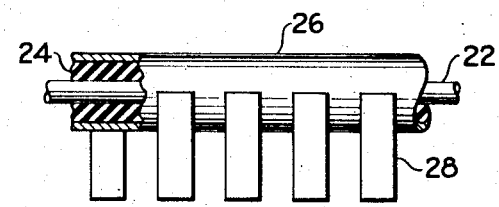
Fig. 5　　　　Fig. 6

3,439,151
APPARATUS FOR STORING HEAT
Matthew Mekjean, Niagara Falls, N.Y., assignor to Hooker Chemical Corporation, Niagara Falls, N.Y., a corporation of New York
Continuation-in-part of application Ser. No. 366,471, May 11, 1964. This application Nov. 20, 1967, Ser. No. 684,179
Int. Cl. H05b 3/06, 3/50
U.S. Cl. 219—530                      8 Claims

ABSTRACT OF THE DISCLOSURE

Electric resistance heaters comprising a resistor sheathed with a heat conductive metal or metal alloy are provided with elongations or protrusions which extend from the heater to the vessel wall which contains a heat storage material. The extensions of the heater sheathing serve to conduct heat from the heater. Good heat conduction serves to more uniformly heat the heat storage material and the vessel walls. Furthermore, the extensions from the heater sheathing serve, in a preferred embodiment, the dual role of conducting heat to the vessel bottom wall through any precipitate of by-product sludge and protecting the heating element from burning out due to the insulating effect of the sludge.

---

This application is a continuation-in-part of copending application Ser. No. 366,471 filed May 11, 1964, now U.S. 3,356,834.

This invention relates to electric heaters. More particularly, it relates to electric heaters utilized in heating a heat storage medium.

It has recently been discovered that a composition comprising a major proportion of an alkali metal hydroxide and a minor proportion of modifiers therefor, can be utilized as the heat storage medium in a heat storage reservoir. An example of such a heat storage medium is a substantially anhydrous alkali metal hydroxide bath composition comprising a major proportion of sodium hydroxide, and minor proportions of sodium nitrate and sodium chromate. Although several means of heating this type of heat storage medium have been proposed and may be utilized, it has been found that the utilization of off-peak electric power, converted directly into heat is an extremely efficient and economical way. Immersion electrodes may be utilized to heat the heat storage medium described above. When such a system is utilized, however, special electrical equipment is often demanded. Also, when electrodes are utilized, one or both of them may have to be replaced from time to time. To avoid the replacement of electrodes and the utilization of special electrical equipment, electrical resistance heating elements have been suggested for use in heating heat storage medium in the reservoir. Generally, the heating elements known to the prior art are not satisfactory and may fail after a time under the conditions present in an alkali metal hydroxide bath, especially at the temperatures to which the bath is subjected, i.e., from about 140 to 1500 degrees Fahrenheit.

It has recently been found that an improved heating element in a heat storage unit comprising an electrical resistor means covered with certain metals and alloys will minimize undesirable effects of the alkali hydroxide heat storage medium at temperatures from about 140 to 1500 degrees Fahrenheit. In addition, it has been recently found that the improved heating elements, when employed under the conditions described, i.e., as heaters for the heat storage medium, are capable of operating at higher temperatures than when they are utilized as heaters outside the heat storage medium. Thus, they are able to add heat to the medium at a very satisfactory rate.

For example, a heating element constructed with one of the coatings mentioned in the preceding paragraph, e.g., Nichrome resistor covered or sheathed in insulating material and low carbon steel, heated outside the heat storage medium, may only reach a temperature of about 750 degrees Fahrenheit before it begins to deteriorate due to atmospheric oxidation. On heating this element in the heat storage medium a temperature of approximately 1250 degrees Fahrenheit is obtainable, safely. Thus, about twice the amount of heat may be produced in the presence of the heat storage medium.

During operation, a heat storage medium comprising a substantially anhydrous alkali metal hydroxide composition forms a by-product sludge which is insoluble in the molten storage material and slowly precipitates to the bottom of the vessel containing the heat storage medium. This by-product sludge is believed to be composed of various metal oxides and salts. As the sludge or precipitate builds-up at the bottom of the vessel containing the alkali metal hydroxide composition, it acts as an insulator, preventing heat conduction to the lower surfaces of the storage vessel. Uneven heating of the vessel walls results in increased pressure and stress being exerted upon certain areas of the container vessel which tends to warp and ultimately break the vessel. Likewise, as the by-product sludge accumulates within the heat storage material it may build up to the point where it contacts and insulates the heating element itself, causing hot spots in the heating element. These insulated "hot spots" greatly decrease heating effectiveness and life of the heater.

In accordance with this invention, heating elements for use in a heat storage vessel operating on the heat of fusion of an alkali metal hydroxide heat storage composition are improved by providing at least one extension or protrusion on the heating element sheathing, said extension contacts by-product build-up which forms during the heating and cooling of heat storage composition and at least one wall of the vessel containing the heat storage composition. An extension on a heating element contemplated by this invention serves to conduct heat from the heating element to a vessel wall thereby producing a more uniform heating of the vessel wall through any accumulation of by-product sludge build-up. Furthermore, the extension from the heating element serves to separate the heating element from the sludge build-up thereby preventing premature burn-out of the resistance heater.

Other aspects and features of the invention will appear from the following description and the accompanying drawing in which:

FIGS. 2, 3 and 4 are perspective views which illustrate modifications of the heating element;

FIG. 5 is a vertical section view of another heating element;

FIG. 6 is a partially cutaway side elevation of part of the heating element of FIG. 5.

Figure 1:
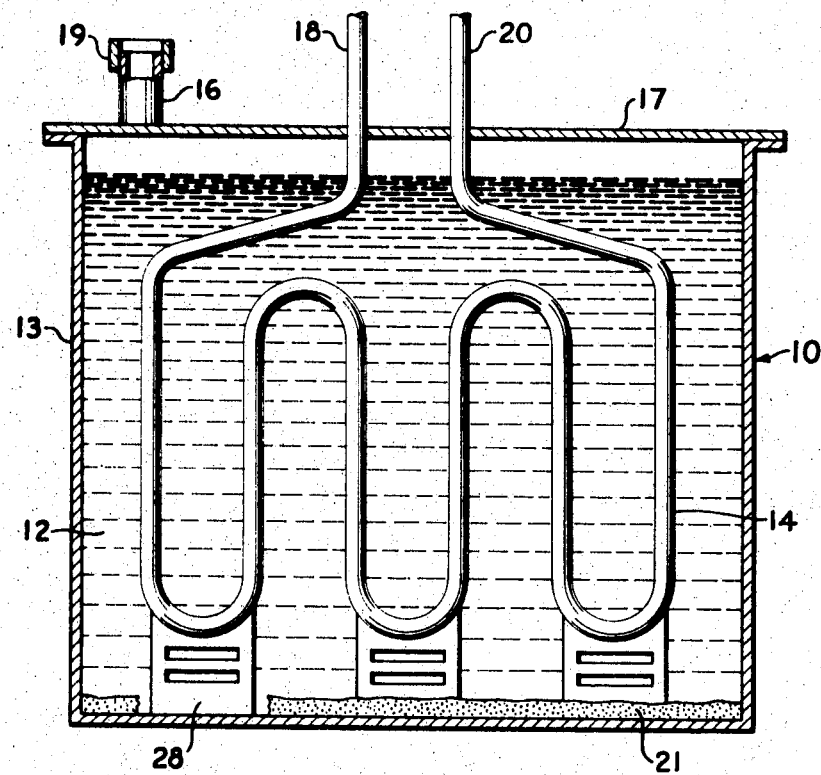
FIG. 1 is a central vertical section of a heat storage reservoir having a modified heating element therein.

In the drawing, heat storage reservoir 10 contains heat storage medium 12 and electric heating element 14. Filling orifice 16 allows the heat storage medium to be added to the reservoir and sealed therein by coupling means 19. This coupling means is connected to a bellows means (not shown) which prevents atmospheric air from entering the reservoir 10.

In another embodiment, the coupling means 19 may be connected to a breather system (not shown) which permits free access by oxygen to the heat storage material. The breather assembly may be equipped with a device to remove carbon dioxide and water from the air before entry into the heat storage reservoir 10. Likewise, the heat storage reservoir 10 may be equipped with internal or external conduit means through which a heat transfer fluid such as water may be heated for direct supply of steam to an apparatus or for heat transfer to an area or medium to which it is desired to supply heat.

Reservoir 10 comprises walls 13 and cover 17 which are constructed of any suitable material such as American Iron and Steel Institute 1020 or lower steel classification or ductile iron. Terminals 18 and 20 of the heating element protrude from reservoir 10 through cover 17. These terminals are connected to a source of electricity (not shown). The areas where terminals 18 and 20 pass through cover 17 are sealed by known means to prevent air or other contaminants from entering reservoir 10. It is to be understood that FIGURE 1 is a diagrammatic illustration of one form of the many configurations available for heat storage reservoirs 10 in combination with heating element 14. Other configurations can be readily adapted to the invention, the only requirement being that the configuration of the heating element be such as to allow the medium to heat efficiently and prevent the distortion of the walls of the reservoir 10 due to the expansion of the medium when it is heated. In FIGURES 2, 3, 4, and 5 various modified heating elements are shown having resistor 22 encompassed by insulating material 24, sheath 26 and having extensions 28 or protrusions 28 of, or from, the sheathing 26.

In one example of operation employing a mild steel sheathed heating element, the heat storage medium 12 will be heated by the electric heating element 14 to a temperature of about 1250 degrees Fahrenheit at which temperature the heating element is turned off. Air may be passed over the reservoir, or a liquid heat transfer medium such as water may be passed in heat transfer relationship with the heat storage medium, to extract heat and supply it to the desired area or medium to be heated. The medium 12 cools at a slow rate and in most cases reheating of the medium is not required for about 24 hours.

During the operation of the reservoir over a long period of time heat distribution in the element may become uneven due to by-product 21 buildup at the base of the reservoir which may cover part of the heating element. This buildup reduces the efficiency of the element 14. FIGS. 2–6 illustrate various structures which can be utilized to cause the heat created in resistor 22 to be more efficiently and uniformly distributed throughout the cell, especially to the bottom thereof, and to prevent burn outs of the heater. FIGURES 2–6 illustrate the adaptation of types of extension 28 attached to or made part of the heating element. FIG. 2 shows an inverted T, FIG. 3 is an illustration of an oval, FIG. 4 shows a segmented extension and FIG. 5 shows an extension containing fins thereon.

These protrusions, or extensions, affixed to, or part of the covering material may be placed at the bottom or over the entire surface of the element. It is to be understood that the metal and alloy covering materials set forth herein are corrosion resistant in the medium at temperatures from 140 to about 1500 degrees Fahrenheit. Those metals which are oxidized to form substantially insoluble oxide films on their surface preferably form an oxide film which is completely insoluble in the medium, but films having a solubility not in excess of 500 parts per million parts of medium at 1480 degrees centigrade are satisfactory.

Further, the metals and alloys that are utilized as covering material should have a melting point above the highest temperature obtainable by the alkali metal hydroxide bath. The thickness of the resistors and the covering materials are standard in the art and can be determined by referring to handbooks available to the art, such as Chemical Engineers Handbook, third edition, published by McGraw-Hill Book Company, New York, p. 417 (1950). Examples of suitable sheathing or covering materials are low carbon steel or mild steel such as the bearing American Iron and Steel Institute Number 1020 and lower classifications; cobalt, nickel, ruthenium, rhodium, palladium, osmium, iridium, platinum, their alloys and other metals of the Group VIII of the Periodic Table; zirconium, and gold. Some examples of alloys are Fe-Al, nickel steels including all percentages of Ni-Fe and up to 4 percent copper; cobalt alloys containing varying percentages of nickel, iron, silica, chromium and others; nickel alloys containing up to 80 percent copper; ferrous alloys, as mild steel and nickel-molybdenum steel, and the like. In all of the above alloys, the carbon content is below 3.0 percent, preferably below 0.3 percent by weight. Many of the preferred alloys are sold under trademarks such as Haynes Stellite Alloy No. 3, 6, 93 and 157 manufactured by Haynes Stellite Co., Hastelloy Alloy A, B, C, D, F and X manufactured by Haynes Stellite Co., Monel K, KR, R and S manufactured by International Nickel Co. and Spang Chalfant 1, 2 and 3 manufactured by National Supply Co. The compositions of the above alloys are further described in Metals Handbook 1948 edition, published by The American Society for Metals, Cleveland, Ohio, in Metals Handbook, eighth edition volumes I and II published 1962–64 by American Society for Metals, Metals Park, Novelty, Ohio, and Chemical Engineers Handbook, second edition, published by McGraw-Hill Book Co., New York, 1941, pp. 2108 through 2129.

These materials may be utilized to protect other good heat conductors which may form part of the protrusion 28, e.g., ductile iron may protect copper, silver or aluminum.

The substantially anhydrous heat storage media of this invention comprise either a neutral or an oxidizing system containing a major proportion by weight of an alkali metal hydroxide and a minor proportion by weight of an additive which will not produce a reducing system in combination with the alkali metal hydroxide. A corrosion inhibitor may also be added to this composition in an amount of from 0.1 to about 25 percent of the composition by weight.

The corrosion inhibitors found to be acceptable in the heat storage system described in the preceding paragraph are selected from the group consisting of alkali metal and alkaline earth metal chromates, dichromates, phosphates, pyrophosphates, manganates, permanganates, tetraborates, borates, iron particles and mixtures thereof such as potassium dichromate, sodium permanganate and so forth. By utilizing these inhibitors corrosion of metals in contact with the alkali metal hydroxide and inorganic non-reducing salt is substantially reduced to give a long life to the reservoir, the heating element and the medium.

Examples of alkali metal hydroxides that may be utilized in this invention are the hydroxides of potassium, sodium, lithium, rubidium, cesium, and mixtuers thereof.

From 1 to about 45 percent of the bath may consist of neutral additives. The additives which, when combined in a minor proportion with an alkali metal hydroxide, produce a neutral system are those compounds such as alkali metal and alkaline earth metal sulfates, phosphates, halides, carbonates, stannates, silicates, fluosilicates, fluoborates, tetraborates, metaborates, aluminates, bismuthates, borates, molybdates, tungstates, vanadates, and mixtures thereof, e.g., sodium carbonate, sodium sulfate, potassium sulfate, lithium carbonate, and the like.

Examples of oxidizing agents which may be utilized in the heat storage media of the invention are alkali metal and alkaline earth metal, nitrates, nitrites, manganates, parmanganates, chlorates, iodates, perchlorates, persulfates, chromates, dichromates, hypochlorites, oxides (e.g., perborates, $MnO_2$, $SnO$, $SnO_2$, $TiO_2$, $MoO_3$, $CrO_3$, $V_2O_5$, $P_2O_5$, $WO_3$) and mixtures thereof which will form non-reducing salts. From 1 to about 45 percent by weight based on the alkali metal hydroxide containing system may consist of these oxidizing additives.

Examples of resistor element materials are Chromel A (78 percent nickel, 20 percent chromium, 2 percent manganese maximum and about 0.06 percent carbon) manufactured by Hoskins Manufacturing Company, Detroit, Mich.; Tophet A (80 percent nickel, 20 percent chromium) manufactured by Wilbur B. Driver Co., Newark, N.J.; Nichrome IV (80 percent nickel, 20 percent chromium) manufactured by Driver Harris Co., Harrison, N.J.; and so forth.

From the above description it is seen that utilization of an insulation material between the resistance heater element and the heater sheath is preferred, primarily to prevent short-circuiting and subsequent loss of the heater. However, in unusual designs, the insulation material may be dispensed with, as in using with silicon-carbide sintered cylindrical rods which may be permitted to glow within the space provided in an open chamber or axially-parallel tube, which chamber protects them from direct contact with the heat storage medium. Of course, air, gas or other substances intermediate heater and tube may be considered to be the insulator.

Examples of insulation material that may be used between the resistance heater element and the sheathing material are magnesium oxide, zirconium oxide, zirconium silicate, titanium dioxide, beryllium oxide, calcium oxide. Such materials have specific heats in the range of 0.01 to 0.30 and are solids throughout the temperature range employed with the disclosed heat storage compositions.

It is apparent that the specific illustrations shown above have been given by way of illustration and not by way of limitation, and that the structures above described are subject to wide variation and modification without departing from the scope or intent of the invention. For example, it is also possible to provide heating elements that will pass through the heat storage media. That is, one terminal will be on the upper side of the heat resevoir and the other terminal will be at the lower side of the heat storage reservoir. It is to be further understood that not just one heating element per reservoir needs to be utilized but that many such heating elements may be employed depending upon the size of the heat storage reservoir and the temperatures desired. Also, it is to be understood that the protective sheathing materials above described, which are in direct contact with the heat storage medium, may be utilized as cladding materials over more thermally conductive metals such as copper, silver or aluminum up to the melting point of these materials.

What is claimed is:
1. A heat storage apparatus, comprising:
(a) a container;
(b) a substantially anhydrous alkali metal hydroxide heat storage composition in said container;
(c) a heating element comprised of an electrical resistor covered with a material selected from the group consisting of gold, zirconium, a metal of Group VIII of the Periodic Table and alloys thereof, said material being electrically insulated from said resistor by insulative means, said heating element being at least partially immersed in said heat storage composition, said material covering said electrical resistor forming at least one extension contacting said container at a point below the upper level of by-product build-up formed during the heating and cooling of said heat storage composition, said extension conducting heat from said heating element to said by-product build-up and said container.

2. The heat storage apparatus of claim 1 in which the heating element is comprised of an electrical resistor covered with a material selected from the group consisting of mild steel, zirconium, gold, nickel, ruthenium, rhodium, osmium, iridium, cobalt, platinum, and alloys thereof.

3. The heat storage apparatus of claim 2, wherein the material covering said electrical resistor contains less than 3 percent carbon and is selected from the group consisting of mild steel, nickel, cobalt and their alloys.

4. The heat storage apparatus of claim 3, wherein the material covering said electrical resistor contains less than 0.3 percent carbon.

5. The heat storage apparatus of claim 1, wherein the material covering said electrical resistor is mild steel.

6. The heating element of claim 1 in which said material sheathing the electrical resistor is nickel.

7. The heating element of claim 1 in which said material sheathing the electrical resistor is a nickel steel.

8. The heating element of claim 1 in which said material sheathing the electrical resistor is a nickel-iron-copper alloy containing about 70 percent nickel, from 0.1 to 4 percent copper and the remainder being iron.

References Cited

UNITED STATES PATENTS

| | | | |
|---|---|---|---|
| 1,802,695 | 4/1931 | Bennett | 165—133 |
| 2,181,484 | 11/1939 | Harris | 338—236 X |
| 2,469,801 | 5/1949 | Vogel et al. | 338—240 X |
| 2,649,532 | 8/1953 | Woodman | 219—316 |
| 2,697,130 | 12/1954 | Korbelak | 13—23 X |
| 2,911,513 | 11/1959 | MacCracken | 219—530 X |
| 2,936,741 | 5/1960 | Telkes | 126—400 X |
| 3,170,227 | 2/1965 | Richmond et al. | 165—142 X |
| 3,213,263 | 10/1965 | Steenbergen | 219—205 |
| 3,356,834 | 12/1967 | Mekjean | 219—530 |

FOREIGN PATENTS 471,505     1937     Great Britain.

VOLODYMYR Y. MAYEWSKY, Primary Examiner.

U.S. Cl. X.R.

219—439, 540, 378; 165—104, 181; 126—400